United States Patent [19]

Anderson

[11] 4,321,827
[45] Mar. 30, 1982

[54] SELF ALIGNING SURFACE TEMPERATURE SENSOR

[75] Inventor: Harry V. Anderson, Minneapolis, Minn.

[73] Assignee: Rosemount Inc., Eden Prairie, Minn.

[21] Appl. No.: 135,334

[22] Filed: Mar. 31, 1980

[51] Int. Cl.³ .......................... G01K 1/16; G01K 7/22
[52] U.S. Cl. ............... 73/343 R; 73/362 AR
[58] Field of Search ............. 73/362 AR, 362.1, 632, 73/375; 128/736, 738; 338/28, 199

[56] References Cited

U.S. PATENT DOCUMENTS

| | | | |
|---|---|---|---|
| 2,195,019 | 3/1940 | Bloomheart | 73/362 AR |
| 2,524,894 | 10/1950 | Dobrin | 73/375 |
| 2,947,171 | 8/1960 | Peltola | 73/362 AR X |
| 3,248,947 | 5/1966 | Weinmann | 73/375 |
| 3,415,448 | 12/1968 | Williams et al. | 73/341 |
| 3,570,312 | 3/1971 | Kreith | 73/362 AR |
| 3,695,112 | 10/1972 | Possell | 73/362 AR |

*Primary Examiner*—Daniel M. Yasich
*Attorney, Agent, or Firm*—Kinney, Lange, Braddock, Westman & Fairbairn

[57] ABSTRACT

A hand held surface temperature sensor assembly including an elongated support adapted to have a hand grip at one end and a temperature sensing element at the other end of the support. The sensing element includes a generally flat surface that is placed contiguous with a surface of a vessel or object to be measured for temperature. The sensing element is mounted to the support through a self aligning ball and socket coupling or swivel so that precise positioning of the major portion of the elongated support relative to the surface is not necessary. The coupling will automatically swivel until the flat surface of the sensing element rests flat against the vessel surface when the sensing element is pressed against the surface under light hand pressure.

5 Claims, 1 Drawing Figure

U.S. Patent    Mar. 30, 1982    4,321,827
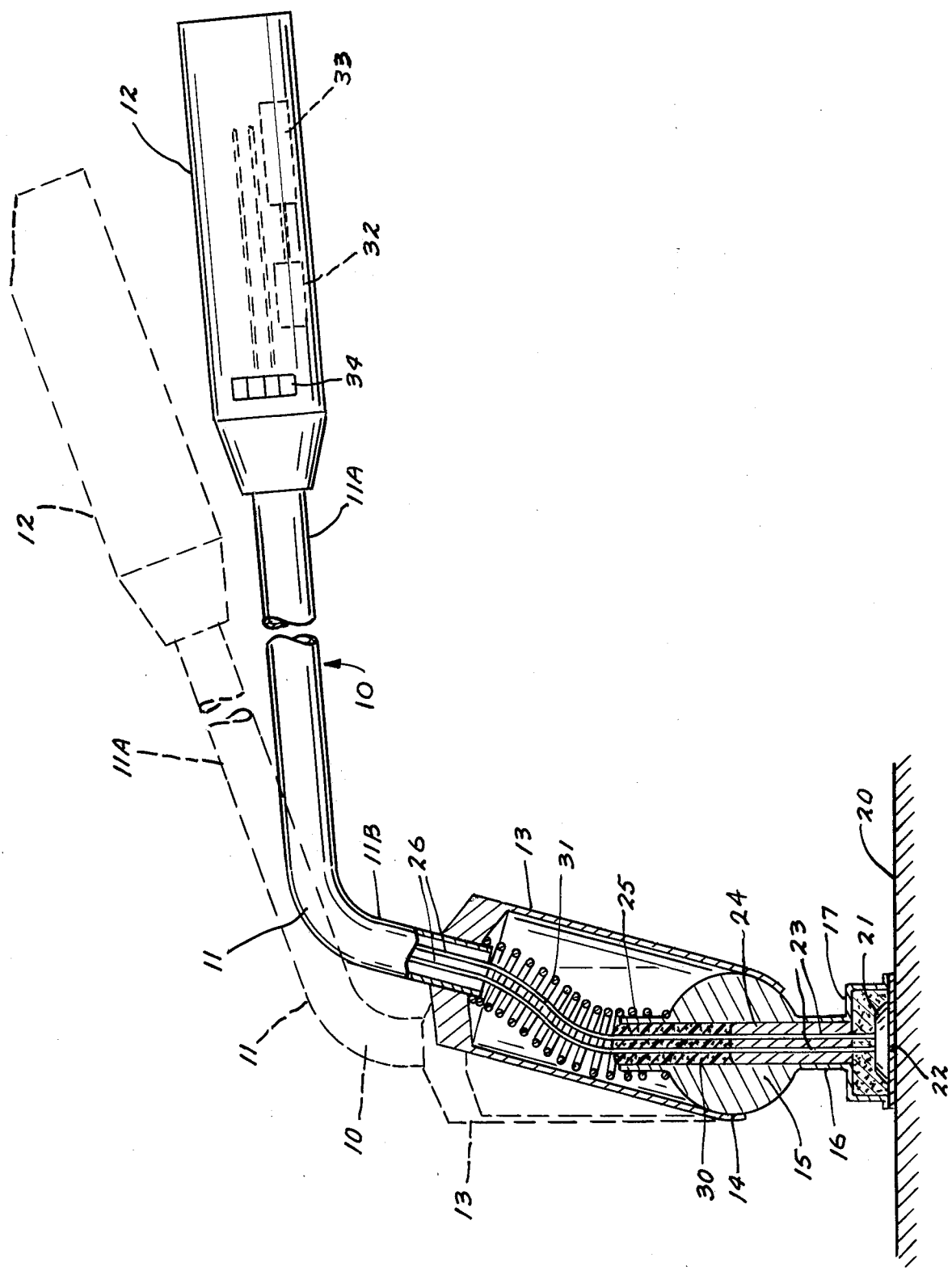

SELF ALIGNING SURFACE TEMPERATURE SENSOR

BACKGROUND OF THE INVENTION

1. Field of the Invention

The present invention relates to a hand held surface parameter sensor assembly for measuring a parameter of external surfaces of objects.

2. Prior Art

Various types of temperature sensing elements have been advanced over the years, and these include hand held sensor assemblies which have temperature sensor elements that are placed against a surface of an object in order to measure the temperature of the surface. The sensor elements have a flat surface that is to be placed against the surface of the object and in order to provide for adequate transmission of heat to the sensor element. Holding the entire sensor surface in contact with the surface of the object is difficult with the hand at the outer end of the elongated support. The two surfaces are many times separated slightly because the sensor surface will be cocked slightly. Cocking of the surface of the temperature sensor results in less heat transfer than is desirable, resulting in a long period of time for reaching an equilibrium in temperature between the surface of the object and the sensor, as well as perhaps causing erroneous readings.

SUMMARY OF THE INVENTION

The present invention relates to a sensor assembly that utilizes a hand held elongated support or probe having a sensor element at one end of the probe. As shown, the sensor element is to be held against a surface of an object for measuring a parameter, as for example, the temperature of the surface. The elongated support is necessary because the hand has to be spaced from the hot surface. The temperature sensor element is mounted to the support through a swivel connector, as shown a ball and socket connection, so that the sensor element will self align when the sensor element is brought into engagement with the surface that is to have its temperature measured.

Additionally, as shown the coupling ball is spring loaded against its socket and can move away from the socket if the amount of force with which the sensor element engages the surface on the object being measured for temperature exceeds the spring load. The spring loading keeps the sensor element loaded under a substantially constant force, thus lowering the likelihood of either too little or too great a force being brought to bear on the sensor element.

By utilizing a self aligning or swivel connection, an operator is able to insure that the temperature of a surface is accurately measured, and that the measurement can be recorded quickly.

The spring loading as shown in the preferred embodiment aids in insuring intimate contact between the sensor and the surface without excessive forces being generated.

If desired, the sensor element, which as shown is a resistance type sensor, can be connected into a measurement bridge and power supply located in the manual handle. The indicator or readout device for temperature can also be contained in this handle.

BRIEF DESCRIPTION OF THE DRAWINGS

The single FIGURE is a side view of a typical hand held temperature assembly made according to the present invention with parts in section to illustrate the ball joint coupling utilized with the assembly.

DESCRIPTION OF THE PREFERRED EMBODIMENT

A surface temperature sensing assembly illustrated generally at 10 includes a tubular mounting support or shaft 11 which as shown has an enlogated portion 11A and a shorter end portion 11B. The elongated portion 11A is adapted to be attached to a handle assembly illustrated generally at 12 which can be gripped by a hand of the person that is using the temperature sensor. The hand thus is spaced from the hot surface which is to be measured for temperature. The opposite end of the tubular support 11 is fixedly connected to a housing 13 which is also tubular. The outer end edge portions of the housing 13 are formed into an annular ball seat 14. A spherical ball 15 is positioned on the interior of housing 13 and mates against the seat 14. The ball 15 in turn has a fixedly connected or integrally formed neck 16 which extends out of the housing 13 and a sensing element housing 17 is fixed to the outer end of neck 16. A temperature sensor or parameter sensor element 21 is mounted in housing 17 and is used for sensing the temperature of a surface 20 of an object such as portion of the apparatus used in an industrial process.

The temperature sensor element 21 is preferably a resistance thermometer. The sensor element includes a sheet or plate 22 having a planar outer face. The plate or sheet 22 is made of heat conducting material, such as a suitable metal. The plate 22 is brazed around its periphery to the housing 17. The housing can be filled with insulation if desired to minimize heat loss. The sensor element 21 has a pair of leads indicated generally at 23 which pass through openings in a ceramic sleeve 24. The sleeve 24 fits within the neck 16, and also fits into a provided opening through the center of the ball 15. The sleeve 24 extends approximately half-way through the ball. The ball 15 has a second neck 25 fixedly attached thereto at its opposite side from neck 16. The neck 25 aligns with the opening in ball 15.

The leads 23 from the sensor element 21 are connected to suitable conductors indicated at 26 and the connection usually is positioned within the openings in the ceramic sleeve 24. The portions of the opening through ball 15 above sleeve 24 and the interior of the neck 25 are filled with a suitable epoxy or other potting compound indicated at 30 to securely hold the leads in position and also to keep the ceramic sleeve 24 in place.

The ball seat 14 faces away from the sensor element and the ball 15 fits against the ball seat 14. The ball 15 is urged against the ball seat 14 with a spring 31, one end of which surrounds the sleeve 25. The opposite end of spring 31 bears against the upper end wall of the housing 13 adjacent the junction with the tubular support 11. The ball is not held against the seat 14 other than through the spring 31.

The ball 15 and its seat 14 therefore form a swivel connection between the hand held support 11 and housing 13, and the temperature sensor element housing 17.

The handle 12, as shown, can be provided with a suitable bridge circuit 32 and a power supply 33 (which will be a small battery) and also, if desired, the handle 12 could have a suitable temperature indicator 34. The entire temperature sensor assembly could thus be self powered and contained.

In the use of hand held sensors, where a sensor surface such as the flat outer surface of plate 22 is placed against another surface 20, the temperature of which is to be measured, it is difficult to hold the assembly so that the surface of plate 22 is contiguous with the surface 20 over its entire area. Usually, even if the surfaces are initially contiguous, with a rigid coupling between the resistance, normal movement of the hands will cause the surfaces to tilt. However, with the ball joint coupling between the element and the elongated support, the plate 22 will self align. The ball joint swivel to position wherein the outer flat surface of the sensor will move to be contiguous with the surface 20 as long as the axis of the housing 13 is reasonably close to perpendicular to the surface 20. The dotted line position of housing 13 illustrates an alternate position permitted with the ball joint connection.

Additionally, the spring 31 will compress slightly and permit the ball 15 to move away from its seat 14, so that the sensor assembly is loaded with a controlled spring load against the surface 20 thus insuring a good thermal contact and also controlling the force on the sensor assembly.

Thus, the combination includes an elongated support or shaft adapted to be held by hand, and a temperature sensor that has a surface to be held in intimate contact with another surface, the temperature of which is to be measured. A swivel connection is utilized adjacent the temperature sensor so that the sensor surface will self align and be positioned contiguous with the surface of the object which is to have its temperature measured, regardless of small errors in the positioning of the hand held elongated support.

The tubular support is rigid so that it will permit applying the locating positioning force on the sensor itself, while the ball-socket junction permits the self alignment, and the spring force that holds the surfaces together.

Other parameters also could be measured using a hand held sensor. For example, noise or vibration at the surface 20 could also be measured with a suitable sensor.

What is claimed is:

1. A sensor assembly adapted to be placed against an object surface for measuring a parameter relating to the object surface comprising a parameter sensor element having an outer surface that is generally planar, the sensor element being adapted to measure the parameter from the object surface when the sensor surface is contiguous with the object surface, an elongated support having first and second ends, the first end being remote from the sensor element and being adapted to be hand held, and coupling means between said sensor element and the second end of said elongated support comprising a universal swivel coupling permitting the sensor element to swivel relative to said elongated support at least a limited number of degrees, said swivel coupling comprising a ball member mounted on the sensor element, a housing mounted on said elongated support adjacent the second end, means forming a ball seat in said housing, said ball being on an opposite side of the seat from the sensor element and seating against said seat for universal swiveling movement, and bias means to normally retain said ball against said seat under a predetermined force and controllably permitting the ball to move away from said seat when force exerted through said elongated support on said sensor element exceeds the predetermined force, and means operatively coupled to the sensor element to provide an indication of the value of the parameter sensed by the sensor element.

2. The combination as specified in claim 1 wherein said sensor element is a resistance thermometer requiring electrical means for operation and a handle mounted on an end of the elongated support remote from the housing, a chamber formed in said handle, said chamber being of size to receive the electrical means for operation of said sensor element.

3. The combination of claim 1 wherein said bias means comprises a coil spring which acts against the ball and controls the force exerted by the ball.

4. The combination as specified in claim 1 wherein said means operatively coupled to the sensor element comprises electrical circuit means mounted in said elongated support.

5. A temperature sensor adapted to be placed against a first surface for measuring the temperature of the surface comprising a sensor element, said sensor element having a sensor surface that is generally planar and adapted to conduct heat from the first surface, and elongated support adapted to be hand held, and coupling means between said sensor element and said elongated support comprising a ball member fixedly mounted on said sensor element, a housing mounted on one end of said elongated support, a socket member formed in said housing and having a ball seat facing in direction away from the sensor element, said ball seating against said ball seat in the socket member for universal swiveling movement, spring means acting between said housing and said ball to centrollably urge the ball against said ball seat, said ball and ball seat comprising a universal swivel coupling permitting the sensor element to swivel relative to the elongated support at least a limited number of degrees as the sensor surface contacts the first surface, said housing being constructed to permit the ball to move away from said seat when load on the sensor element and ball in direction away from the seat exceeds the spring force, and means operatively coupled to said sensor element for providing a signal indicating the temperature sensed by the sensing element.

* * * * *

UNITED STATES PATENT OFFICE
CERTIFICATE OF CORRECTION

Patent No. 4,321,827　　　　　　　　Dated March 30, 1982

Inventor(s) Harry V. Anderson

It is certified that error appears in the above-identified patent and that said Letters Patent are hereby corrected as shown below:

Column 2, line 12, "enlogated" should be --elongated--; Column 2, line 29 before "portion" insert --a--. Column 3, line 13, before "swivel" insert --will--. Column 4, line 35, (Claim 5, line 5), "and" (second occurrence) should be --an--; Column 4, line 45, (Claim 5, line 15), "centrollably" should be --controllably--.

Signed and Sealed this

Thirteenth Day of July 1982

[SEAL]

Attest:

Attesting Officer

GERALD J. MOSSINGHOFF

Commissioner of Patents and Trademarks